US011477992B2

(12) United States Patent
Van Isacker

(10) Patent No.: US 11,477,992 B2
(45) Date of Patent: Oct. 25, 2022

(54) DEVICE FOR PREPARING A FROZEN FOOD PRODUCT FROM A LIQUID MIXTURE

(71) Applicant: KEMPISCHE BRIK CENTRALE, Zaventem (BE)

(72) Inventor: Frederik Van Isacker, Zaventem (BE)

(73) Assignee: IMMO DALO NV, Zaventem (BE)

(*) Notice: Subject to any disclaimer, the term of this patent is extended or adjusted under 35 U.S.C. 154(b) by 0 days.

(21) Appl. No.: 17/021,898

(22) Filed: Sep. 15, 2020

(65) Prior Publication Data

US 2022/0022487 A1 Jan. 27, 2022

Related U.S. Application Data

(63) Continuation of application No. PCT/EP2020/070860, filed on Jul. 23, 2020, and a
(Continued)

(51) Int. Cl.
*A23G 9/12* (2006.01)
*A23G 9/22* (2006.01)

(52) U.S. Cl.
CPC .............. *A23G 9/12* (2013.01); *A23G 9/228* (2013.01)

(58) Field of Classification Search
CPC ... A23G 9/04; A23G 9/12; A23G 9/16; A23G 9/163; A23G 9/228; A23G 9/08
See application file for complete search history.

(56) References Cited

U.S. PATENT DOCUMENTS 1,738,879 A * 12/1929 Epperson ................. A23G 9/12
426/660
3,393,900 A 7/1968 Wagner et al.
(Continued)

FOREIGN PATENT DOCUMENTS

CA 3097412 A1 10/2019
EP 0 162 023 A2 11/1985
(Continued)

OTHER PUBLICATIONS

International Search Report and Written Opinion dated Apr. 8, 2021, issued in related International Application No. PCT/EP2020/070860, filed on Jul. 23, 2020, 12 pages.
(Continued)

*Primary Examiner* — Miguel A Diaz
(74) *Attorney, Agent, or Firm* — Christensen O'Connor Johnson Kindness PLLC

(57) ABSTRACT

A device is provided for preparing a frozen food product from a liquid mixture. The device includes a first sub-unit, a second sub-unit, and a cooling unit. The first cup holder has a cavity configured for releasably receiving a cup in which the frozen food product is to be prepared from the liquid mixture, and a first stirring unit associated with the first cup holder. The second sub-unit has a second cup holder with a cavity configured for releasably receiving a cup in which the frozen food product is to be prepared from the liquid mixture, and a second stirring unit associated with the second cup holder. The cooling unit is configured for cooling the cavity of the first and/or second cup holder during an operational phase of respectively the first and/or second sub-unit.

19 Claims, 6 Drawing Sheets

Related U.S. Application Data continuation of application No. PCT/EP2020/070861, filed on Jul. 23, 2020, and a continuation of application No. PCT/EP2020/070862, filed on Jul. 23, 2020, and a continuation of application No. PCT/EP2020/070863, filed on Jul. 23, 2020, and a continuation of application No. PCT/EP2020/070864, filed on Jul. 23, 2020, and a continuation of application No. PCT/EP2020/072523, filed on Aug. 11, 2020.

(56) References Cited

U.S. PATENT DOCUMENTS

| | | | |
|---|---|---|---|
| 4,538,427 A * | 9/1985 | Cavalli | F25D 11/00 62/342 |
| 4,547,076 A | 10/1985 | Maurer | |
| 4,583,863 A * | 4/1986 | Pandolfi | A23G 9/12 366/149 |
| 5,205,129 A | 4/1993 | Wright et al. | |
| 7,878,021 B2 * | 2/2011 | Perrier | A23G 9/106 366/221 |
| 3,414,182 A1 | 4/2013 | Kozlowski et al. | |
| 8,414,183 B2 | 4/2013 | Kozlowski et al. | |
| 8,801,266 B2 | 8/2014 | Kozlowski et al. | |
| 8,845,183 B2 | 9/2014 | Kozlowski et al. | |
| 9,320,290 B2 * | 4/2016 | Cocchi | A23G 9/12 |
| 9,993,015 B2 | 6/2018 | Geng et al. | |
| 10,039,298 B2 * | 8/2018 | Noth | B65D 85/804 |
| 10,105,665 B2 | 10/2018 | Goodson | |
| 10,375,973 B2 * | 8/2019 | Noth | A23G 9/28 |
| 10,426,180 B1 * | 10/2019 | Fonte | A23G 9/224 |
| D909,433 S * | 2/2021 | Lee | D15/82 |
| 10,923,233 B1 | 2/2021 | Wang et al. | |
| 11,033,044 B1 * | 6/2021 | Fonte | A23G 9/281 |
| 11,052,357 B2 | 7/2021 | Noth | |
| 2006/0263490 A1 * | 11/2006 | Wall | A23G 9/20 426/101 |
| 2008/0080301 A1 | 4/2008 | Cao et al. | |
| 2008/0282723 A1 * | 11/2008 | Perrier | A23G 9/12 62/342 |
| 2011/0216623 A1 * | 9/2011 | Kozlowski | B01F 15/00 366/315 |
| 2012/0096876 A1 * | 4/2012 | Ravji | A23G 9/12 62/68 |
| 2012/0250453 A1 | 10/2012 | Kozlowski et al. | |
| 2013/0340456 A1 * | 12/2013 | Hoare | A23G 9/04 62/126 |
| 2015/0296831 A1 * | 10/2015 | Noth | A23G 9/287 141/11 |
| 2016/0278401 A1 * | 9/2016 | Noth | A23G 9/28 |
| 2016/0366906 A1 * | 12/2016 | Geng | B01F 15/065 |
| 2017/0188600 A1 * | 7/2017 | Semo Scharfman | A23G 9/22 |
| 2017/0197191 A1 | 7/2017 | Goodson | |
| 2017/0215456 A1 * | 8/2017 | Noth | A23G 9/283 |
| 2017/0225879 A1 * | 8/2017 | Stein | B65D 85/78 |
| 2018/0064131 A1 * | 3/2018 | Noth | B01F 7/1605 |
| 2018/0064132 A1 * | 3/2018 | Noth | B01F 7/0095 |
| 2018/0084800 A1 * | 3/2018 | Noth | A23G 9/08 |
| 2018/0117545 A1 | 5/2018 | Noth | |
| 2018/0317518 A1 * | 11/2018 | Noth | A23G 9/10 |
| 2019/0015803 A1 | 1/2019 | Goodson | |
| 2019/0053514 A1 | 2/2019 | Fonte | |
| 2020/0022382 A1 * | 1/2020 | Fonte | A23G 9/52 |
| 2020/0315206 A1 * | 10/2020 | Fonte | A23G 9/22 |
| 2021/0007370 A1 * | 1/2021 | Fonte | B65D 51/32 |
| 2021/0084930 A1 | 3/2021 | Fonte | |
| 2021/0106958 A1 | 4/2021 | Medici | |
| 2021/0145021 A1 * | 5/2021 | Noth | A23G 9/287 |
| 2021/0212338 A1 * | 7/2021 | Fonte | A23G 9/281 |

FOREIGN PATENT DOCUMENTS

| | | | |
|---|---|---|---|
| EP | 0162023 A2 | 11/1985 | |
| EP | 0240085 A1 * | 10/1987 | H02K 7/116 |
| EP | 2103534 A1 | 9/2009 | |
| EP | 2311324 B1 | 12/2014 | |
| EP | 3273189 A1 | 1/2018 | |
| EP | 3062631 B1 | 6/2018 | |
| EP | 3062630 B1 | 5/2019 | |
| EP | 3062629 B1 | 7/2019 | |
| GB | 1205999 A | 9/1970 | |
| GB | 2135037 A | 8/1984 | |
| GB | 2143016 A | 1/1985 | |
| IT | UD20090070 A1 | 10/2010 | |
| WO | 2011040584 A1 | 4/2011 | |
| WO | 2015/006802 A1 | 1/2015 | |
| WO | 2015006802 A1 | 1/2015 | |
| WO | 2015169841 A1 | 11/2015 | |
| WO | 2016092486 A1 | 6/2016 | |
| WO | 2019117804 A1 | 6/2019 | |
| WO | 2020037296 A1 | 2/2020 | |

OTHER PUBLICATIONS

International Search Report and Written Opinion dated Apr. 19, 2021, issued in related International Application No. PCT/EP2020/070861, filed on Jul. 23, 2020, 11 pages.

International Search Report and Written Opinion dated Apr. 9, 2021, issued in related International Application No. PCT/EP2020/070862, filed on Jul. 23, 2020, 12 pages.

International Search Report and Written Opinion dated Apr. 9, 2021, issued in related International Application No. PCT/EP2020/070863, filed on Jul. 23, 2020, 12 pages.

International Search Report and Written Opinion dated Apr. 9, 2021, issued in related International Application No. PCT/EP2020/070864, filed on Jul. 23, 2020, 13 pages.

International Search Report and Written Opinion dated Apr. 9, 2021, issued in related International Application No. PCT/EP2020/072523, filed on Aug. 11, 2020, 16 pages.

* cited by examiner

DEVICE FOR PREPARING A FROZEN FOOD PRODUCT FROM A LIQUID MIXTURE

TECHNICAL FIELD

The present disclosure relates to a device for preparing a frozen food product, such as for example ice cream or sorbet, from a liquid mixture, as well as to the use of such a device.

BACKGROUND

Devices for preparing a frozen food product, such as for example ice cream or sorbet, from a liquid mixture, are known in the prior art. The patent publication WO2015169841 A1 discloses such a device. The device comprises the following elements:

a cup holder comprising a cavity configured for releasably receiving a cup in which the frozen food product is to be prepared from the liquid mixture, a cooling unit configured for cooling the cavity of the cup holder; and a stirring unit associated with the cup holder.

A problem with the device of WO2015169841, as well as with other devices from the prior art, is that the quantity of frozen food product to be prepared in a given timeframe is low. It has been found by the inventors of the present invention that merely enlarging the volume of the cup is not an adequate solution because the enlarged cup would require a longer preparation time, in particular a longer cooling time, than a small cup thereby again extending the preparation time. This longer cooling time is a consequence of the greater separation between the bulk of the liquid mixture and the cooling unit of the device, thereby decreasing the temperature gradient between the bulk of the liquid mixture on the one hand and the cooling device on the other hand. The skilled person would therefore be inclined to increase the temperature gradient by providing the cooling unit at a lower temperature. The inventors of the present invention have however found that by lowering the temperature of the cooling unit, the risk of creating ice crystals on the cup sidewalls is increased, and a non-homogenous cooling of the liquid mixture is obtained, thereby resulting in a low quality frozen food product.

SUMMARY

It is an aim of the present disclosure to provide a device for preparing a frozen food product, such as for example ice cream or sorbet, from a liquid mixture, wherein the problem from the prior art is solved, i.e. to provide a device wherein a greater quantity of frozen food product can be prepared whilst maintaining the quality of the frozen food product.

This aim or others is achieved with a device for preparing a frozen food product from a liquid mixture, comprising:

a first sub-unit comprising a first cup holder comprising a cavity configured for releasably receiving a cup in which the frozen food product is to be prepared from the liquid mixture, and a first stirring unit associated with the first cup holder for example positioned above the cavity of the first cup holder, a second sub-unit comprising a second cup holder comprising a cavity configured for releasably receiving a cup, i.e. a further cup, in which the frozen food product is to be prepared from the liquid mixture, and a second stirring unit associated with the second cup holder, for example positioned above the cavity of the second cup holder, and a cooling unit configured for cooling the cavity of the first and/or second cup holder during an operational phase of respectively the first and/or second sub-unit.

This device of the present disclosure allows to prepare the frozen food product by simultaneously cooling and stirring the liquid mixture in the first and the second cups respectively received in the cavities of the first and second cup holder. The quantity of the frozen food product to be prepared during a given preparation time is for example doubled with respect to the same device comprising only the first sub-unit, whilst the quality of the frozen food product is the same as the quality of the frozen food product prepared with the same device comprising only the first sub-unit. By splitting the greater volume of liquid mixture in two cups, instead of one larger cup, the average distance between the bulk of the liquid mixture in the separate cups on the one hand and the cooling unit on the other hand, is lower than the average distance between the bulk of the larger cup on the one hand and the cooling unit on the other hand. Therefore, the temperature gradient between the bulk of the liquid mixture in the separate cup and the cooling unit is increased with respect to the temperature gradient between the bulk of the liquid mixture in the larger cup and the cooling unit even whilst maintaining the cooling temperature of the cooling unit. It is a further advantage of devices of the present disclosure that a different frozen food product can be prepared in each of the two separate cups. This allows for example to simultaneously prepare a sorbet in one cup whilst preparing a dairy based ice cream in the other cup.

According to an embodiment of the present disclosure, the device is designed to prepare individual servings of frozen food product. i.e. in a cup for example holding less than 1 litre, for example less than 0.5 litre, preferably less than 0.33 litre of frozen food product.

According to an embodiment of the present disclosure, the cup and the cavity of the cup holder have a particular shape, in particular a similar shape, as described in the patent application with application number PCT/EP2020/070861. The entire content of PCT/EP2020/070861 is therefore incorporated in the present patent application.

According to an embodiment of the present disclosure, the cup and the cup holder are arranged for preventing rotation of the cup in the cavity of the cup holder as described in the patent application with application number PCT/EP2020/070860. The entire content of PCT/EP2020/070860 is therefore incorporated in the present patent application.

According to an embodiment of the present disclosure, the device is arranged to detect the content of the liquid mixture, for example to detect if the liquid mixture will yield a sorbet or a dairy based frozen food product. The device is furthermore arranged to differentiate the preparation of the frozen food product depending on the detected content of the liquid mixture. The device therefore comprises the means as described in the patent application with application number PCT/EP2020/070862. The entire content of PCT/EP2020/070862 is therefore incorporated in the present patent application.

According to an embodiment of the present disclosure, the stirring unit comprises a stirring element and a coupling element as will be described below. According to an embodiment of the present disclosure, the device further comprises means, in particular a proximity sensor, for detecting the correct coupling of the stirring element to the coupling element, as described in the patent application with application number PCT/EP2020/070863. The entire content of PCT/EP2020/070863 is therefore incorporated in the present patent application. According to an embodiment of the present disclosure, the coupling element and the stirring element are coupled to each other with a bayonet type coupling as described in the patent application PCT/EP2020/070864. The entire content of PCT/EP2020/070864 is therefore incorporated in the present patent application.

In the further description below, embodiments of the device specifically related to the cooling unit will be described.

According to an embodiment of the present disclosure, the cooling unit comprises a first individual part comprising a throttling element and a first evaporator, wherein the first evaporator is positioned around the cavity of the first cup holder. The cooling unit furthermore comprises a second individual part comprising a second throttling element and a second evaporator, wherein the second evaporator is positioned around the cavity of the second cup holder. The cooling unit further comprises a common part comprising a compressor and a condenser. Preferably, the common part is the part of the cooling unit that is mutualised by the different sub-units, whilst the individual parts are associated with an individual sub-unit. The common part is connected to the first and second individual parts such as to deliver compressed liquid medium to the individual parts and to receive decompressed gaseous medium from the individual parts. The common part and the individual parts for example comprise tubing for carrying a heat medium such as R290, R134a, R12 or R22, preferably R290. The tubing in the common part interconnects the compressor with the condenser. Beyond the condenser, the tubing of the common part splits into a first branch on which tubing of the first individual part connects and a second branch on which the tubing of the second individual branch connects. Beyond the compressor, the tubing of the common part splits into a third branch on which the tubing of the first individual part connects and a fourth branch on which the tubing of the second individual part connects. The tubing of the first individual part sequentially interconnects the first branch of the common part, the first throttling element, the first evaporator and the third branch of the common part. The tubing of the second individual part sequentially interconnects the second branch of the common part, the second throttling element, the second evaporator and the fourth branch of the common part. The present embodiment has the advantage that each individual part can be separately activated during the operational phase of its corresponding sub-unit. Each individual part for example comprises an on/off-switch that is opened when the sub-unit of the individual part is in the operational phase. A further advantage is that each individual part can cool the cavity of its corresponding cup holder of its corresponding sub-unit according to a different cooling program. A cooling program for example comprises a specific temperature imposed on the evaporator as a function of time for example a first temperature during a first time interval followed by a second different temperature during a second time interval. This embodiment is particularly advantageous when different types of frozen food products are prepared in the different cups, because different types of frozen food products require different preparation methods including different cooling programs. This embodiment is also advantageous for simultaneously preparing frozen food products in different cups in different sub-units when the operational phase for the different sub-units is not started at the same time. In these cases, the evaporator of the individual parts can cool the heat medium to a different temperature at the same point in time, for example by differently adjusting the throttling elements in the first individual part and the second individual part.

According to an embodiment of the present disclosure, the device comprises further, i.e. at least a third, sub-unit and the cooling element comprises a further, i.e. at least a third, individual part of the cooling unit. The technical features applicable to the first sub-unit and to the first individual part of the cooling unit apply mutatis mutandis respectively to the further, i.e. at least third, sub-unit and the further, i.e. at least third, individual part of the cooling unit.

According to an embodiment of the present disclosure, the cooling unit is a vapor compression refrigeration system.

According to an embodiment of the present disclosure, the throttling element i.e. the first and/or the second throttling element, is an expansion valve, such as a thermostatic expansion valve.

According to an embodiment of the present disclosure, the evaporator i.e. the first evaporator and/or the second evaporator, comprises a fluid channel coiled around the sidewalls of the cavity of the cup holder in a helical winding. Preferably, the helical winding of the fluid channel forms a frustrated cone i.e. the helical windings form a cone, preferably a right cone, whose top is cut off. In some embodiments, the slope of the cone follows the slope of the sidewalls of the cavity of the cup holder. The slope of the cone is defined by the inclination angle ($\alpha$) of the cone sidewalls with respect to the centre axis of the cone. The inclination angle ($\alpha$) is preferably at least 1°, preferably at least 2°, more preferably at least 3°, even more preferably, at least 4°, and of at most 9°, preferably at most 8°, more preferably at most 7°, even more preferably at most 6°, and most preferably of 5°. According to an embodiment of the present disclosure, the evaporator further comprises a fluid channel, for example as a continuation of the helically wrapped fluid channel, coiled underneath the bottom wall of the cavity of the cup holder, preferably in a spiral winding.

According to an embodiment of the present disclosure, the fluid channel of the evaporator is enrobed by a thermally conductive material such as to increase the area of contact between the fluid channel and the cavity. Preferably, the enrobing of the fluid channel with the thermally conductive material is obtained by pouring liquid thermally conductive material over the fluid channel. Preferably, the thermally conductive material is a thermally conductive metal, preferably copper. The thermally conductive material preferably is delimited by a cooling surface i.e. the surface adjacent to the cup when in use. The cooling surface forms a continuous surface, i.e. as opposed to the discontinuous surface formed by the adjacently positioned fluid channel windings, thereby increasing the contact area between the evaporator and the cavity. According to one embodiment, the cooling surface of the thermally conductive material forms the cavity walls, i.e. the sidewall and bottom wall of the cavity of the cup holder with which the cup comes into direct contact. In an alternative embodiment the cooling surface covered by an intermediate plate forming the cavity walls with which the cup comes in direct contact.

According to an embodiment, the cooling surface of the thermally conductive material of the evaporator is cup-shaped. Implementing details about the shape of the cooling surface are described below. It has been found that the thermally conductive material is easily formed with such a cooling surface. Forming a similar, albeit non-continuous, surface with the fluid channels of the evaporator is much more difficult to achieve. Preferably, the cooling surface of the thermally conductive material comprises an bottom portion, a circumferential upright portion, and a circumferential transition portion extending from the bottom portion to the upright portion. The bottom portion, the upright portion and the transition portion are cylindrically symmetric around a first axis centrally through the bottom portion and extending along a height direction. The transition portion has in the height direction a radius of curvature of at least 15 mm, preferably at least 16 mm, more preferably at least 17 mm, even more preferably at least 18 mm, and yet even more preferably at least 19 mm. The transition portion has in the height direction a radius of curvature of at most 25 mm, preferably at most 24 mm, more preferably at most 23 mm, even more preferably at most 22 mm, and yet even more preferably at most 21 mm. The upright portion is inclined outwards in a transverse or radial direction from the height direction. The upright portion has with respect to the height direction a predetermined inclination angle of at least 1°, preferably at least 2°, more preferably at least 3°, and even more preferably at least 4°. The upright portion has with respect to the height direction a predetermined inclination angle of at most 9°, preferably at most 8°, more preferably at most 7°, and even more preferably at most 6°. Most preferably, the upright portion has with respect to the height direction a predetermined inclination angle of 5°. The present embodiment offers the advantage that the curvature of the transition portion snug fits with a cup whose transition portion is adapted more to the curvature of the sides of a spoon, such that it becomes easier to scoop frozen food product from the transition portion by a spoon. Furthermore the upright portion having the predetermined inclination angle with respect to the height directions allows to provide a snug fit with a cup having a similar inclined upright portion which aids in keeping liquid mixture and the frozen food product in the cup while the frozen food product is being prepared in the cup by stirring the liquid mixture in the cup by the stirring element. In an embodiment the bottom portion is flat. The flat bottom portion offers the advantage that it snug fits with a cup having a similar bottom portion which provides a simple surface from which food product can easily be scooped by a spoon, and from which the stirring element of the device for preparing the frozen food product from the liquid mixture can easily scrape frozen liquid mixture when stirring the liquid mixture in the cup for preparing the frozen food product. In an embodiment the bottom portion has a predetermined radius of at least 16 mm, preferably at least 17 mm, more preferably at least 18 mm, even more preferably at least 19 mm, and yet even more preferably at least 20 mm. The bottom portion has a predetermined radius of at most 26 mm, preferably at most 25 mm, more preferably at most 24 mm, even more preferably at most 23 mm, and yet even more preferably at most 22 mm. In an embodiment the transition portion in the height direction is one of an elliptic arc, a circular arc and a parabolic arc. This embodiment offers the advantage that the shape of the transition portion is snug fit with the cup having a similar transition portion which is adapted more to the shape of the sides of a spoon, such that it becomes easier to scoop frozen food product from the transition portion by a spoon. This embodiment is also beneficial for providing a cup for preparing individual portions of the frozen product therein. In an embodiment the transition portion extends in the transverse direction over a predetermined first distance of at least 15 mm, preferably at least 16 mm, more preferably at least 17 mm, even more preferably at least 18 mm, and yet even more preferably at least 19 mm. The transition portion extends in the transverse direction over a predetermined first distance of at most 25 mm, preferably at most 24 mm, more preferably at most 23 mm, even more preferably at most 22 mm, and yet even more preferably at most 21 mm. This embodiment offers the advantage that a large transition portion is provided which is snug fit with a cup having a similar large transition portion, which corresponds more to the size of a spoon, such that it becomes even more easy to scoop frozen food product from the transition portion by a spoon. This embodiment is also beneficial for providing a cup for preparing individual portions of the frozen product therein. In an embodiment the transition portion extends in the height direction over a predetermined second distance of at least 15 mm, preferably at least 16 mm, more preferably at least 17 mm, even more preferably at least 18 mm, and yet even more preferably at least 19 mm. The transition portion extends in the height direction over a predetermined second distance of at most 25 mm, preferably at most 24 mm, more preferably at most 23 mm, even more preferably at most 22 mm, and yet even more preferably at most 21 mm. This embodiment offers the advantage that a large transition portion is provided which is snug fit with a cup having a similar large transition portion which corresponds more to the size of a spoon, such that it becomes even more easy to scoop frozen food product from the transition portion by a spoon. This embodiment is also beneficial for providing a cup for preparing individual portions of the frozen product therein. In an embodiment the upright portion extends in the height direction over a predetermined third distance of at least 22 mm, preferably at least 23 mm, more preferably at least 24 mm, even more preferably at least 25 mm, and yet even more preferably at least 26 mm. The upright portion extends in the height direction over a predetermined third distance of at most 42 mm, preferably at most 41 mm, more preferably at most 40 mm, even more preferably at most 39 mm, and yet even more preferably at most 38 mm. The upright portion extending in the height direction over the predetermined third distance allows a snug fit with a cup having a similar upright portion which is beneficial for keeping liquid mixture and the frozen food product in the cup while the frozen food product is being prepared in the cup by stirring the liquid mixture in the cup by the stirring element. This embodiment is also beneficial for providing a cup for preparing individual portions of the frozen product therein. In an embodiment the upright portion is straight in the height direction. The upright portion being straight in the height direction offers the advantage that it snug fits with a cup having a similar straight upright portion which provides a simple surface from which the stirring element of the device for preparing the frozen food product from the liquid mixture can easily scrape frozen liquid mixture when stirring the liquid mixture in the cup for preparing the frozen food product.

According to an embodiment of the present disclosure, thermal insulation, in particular having a thermal conductivity lower than air, is provided between the first evaporator and the second evaporator. This embodiment ensures that the influence of the operational phase of the first sub-unit on the operational phase of the second sub-unit is minimized i.e. it ensures that the sub-units can operate according to different cooling programs without excessively influencing each other.

According to an embodiment of the present disclosure, during the operational phase of the first and/or second sub-unit, respectively the first and/or second stirring unit are active, and the cooling unit is active, such as to transform liquid mixture into the frozen food product. Preferably the device comprises a control unit, also referred to as a central processing unit (CPU) or control circuit. The cooling unit and the motor of the first and/or second stirring unit for example receive instructions to work i.e. to be active, from the CPU. During the operational phase of a sub-unit the cooling unit for example cools the cavity of the cup holder of said sub-unit according to a predetermined cooling program, and a motor of the stirring unit of said sub-unit for example rotates, thereby imparting a stirring motion to a stirring element via a coupling element of the stirring unit. During the operational phase, the motor of the stirring unit can for example be instructed to rotate according to a driving program comprising different rotational speeds and/or torque levels as a function of time. Preferably the common part of the cooling unit is active, i.e. is instructed to be active by the CPU, if any one of the first and second sub-unit is in the operational phase. Preferably, during the operational phase of the first and/or second sub-unit respectively the first and/or second individual part of the cooling unit is active, i.e. is instructed to be active by the CPU. In particular, when only one of the sub-units is in the operational phase, only the common part, as well as the stirring element and individual part of said sub-unit are active, i.e. instructed to be active by the CPU Preferably the first and second individual parts of the cooling unit are provided with an opening/closing-valve between the common part of the cooling unit and their throttling element. Preferably the activation of the first and/or second individual part of the cooling unit comprises opening the opening/closing-valve, i.e. the CPU instructs the opening/closing-valve to open.

According to an embodiment of the present disclosure, the device comprises a central processing unit (CPU), also referred to as a control unit as described above. Preferably, the first and/or second sub-unit enters the operational phase, for example by instruction of the CPU as described above, when the CPU has received predetermined safety signals i.e. predetermined safety signals associated with respectively the first and/or second sub-unit. The safety signals indicate to the CPU whether the first and/or second sub-unit is ready to start the operational phase.

According to an embodiment of the disclosure, one of the predetermined safety signals is a start/stop signal generated by pressing a start/stop button provided on each sub-unit of the device.

According to an embodiment of the disclosure, each sub-unit comprises a protective screen attached to the stirring unit in such a manner that the protective screen can be moved from an open position wherein the cavity of the cup holder is accessible to a user, to a closed position wherein the protective screen touches the cup holder such that the cavity of the cup holder is not accessible to the user, and wherein a closed-screen signal is generated when the protective screen is in the closed position, and wherein one of the predetermined safety signals is the closed screen signal. The protection screen is further described in the incorporated patent applications PCT/EP2020/070861 and PCT/EP2020/070860.

According to an embodiment of the present disclosure, the cup holder comprises a detection means for detecting the presence of a cup in the cavity of the cup holder and for emitting a presence signal upon detecting the presence of the cup in the cavity of the cup holder, and wherein one of the predetermined safety signals is the presence signal. The detection means for example comprises a relay provided in the cup holder that closes upon application of the weight of the cup.

According to an embodiment of the present disclosure, each stirring unit comprises a stirring element configured for stirring with a stirring motion the liquid mixture in the cup for preparing the frozen food product and preferably also configured for scraping ice crystals from the walls of the cup, and a drive system configured for driving the stirring motion of the stirring element in the cup. The drive system comprises a motor, preferably an electromotor such as a stepper motor, a synchronous motor, an induction motor or a reluctance motor. The motor preferably comprises a stator, a rotor and an output shaft connected to the rotor. The drive system further comprises a coupling element. The coupling element is configured for releasably coupling the stirring element to the motor. The coupling element is preferably configured for transforming the rotational movement of the output shaft of the motor into the stirring motion of the stirring element. The coupling element comprises a fixed part preferably provided at a fixed position relative to the motor, in particular relative to the stator of the motor, and a moveable part moveably arranged relative to the fixed part. The moveable part comprises a rotor part arranged during an operational phase to rotate with respect to the fixed part and a translating part attached to the rotor part by a spring member such as to enable during an initialization phase the translation of the translating part with respect to the rotor part along a first translational axis and such as to follow during the operational phase the rotation of the rotor part. Preferably the translation of the translating part with respect to the rotor part during the initialization phase results in the translation of the translating part with respect to the fixed part, for example because the rotor part is translationally fixed, i.e. not allowed to translate, with respect to the fixed part along the first translation axis. Preferably the spring member comprises a spring such as a helical spring, an elastic material spring or a pneumatic spring. The translating part furthermore comprises coupling means to releasably couple with the stirring element. The fixed part comprises a proximity sensor arranged to detect the distance of the translating part relative to the fixed part, in particular relative to the proximity sensor, along the first translational axis and to generate an activation signal when the distance is below a predetermined proximity threshold. Preferably, the translating part comprises magnetised means configured to generate a magnetic field, and wherein the proximity sensor is a Hall sensor configured to measure the magnetic flux created by the magnetic field. Further details regarding the proximity sensor and the generation of the activation signal are described in the incorporated patent application PCT/EP2020/070863. According to an embodiment of the present disclosure, one of the predetermined safety signals is the activation signal.

It is a further aim of the present disclosure to provide a method for making a frozen food product from a liquid mixture. The method comprises providing the device as described above. The method further comprising placing a first cup with liquid mixture into the cavity of the cup holder of the first sub-unit, and placing a second cup with liquid mixture into the cavity of the cup holder of the second sub-unit. The method further comprises making the frozen food product from the liquid mixture in the first and/or second sub-unit during the operational phase of the first and/or second sub-unit. Preferably the method comprises, during the operational phase of the first and/or second sub-unit, keeping the respectively first and/or second stirring units active, for example under instruction of the CPU, and keeping the cooling unit active, for example under instruction of the CPU, such as to transform the liquid mixture into the frozen food product. The method preferably comprises starting the operational phase of the first and/or second sub-unit by activating, for example under instruction of the CPU, the cooling unit, preferably the common part of the cooling unit and respectively the first and/or second individual part of the cooling unit, and by activating, for example under instruction of the CPU, respectively the first and/or second stirring unit. Preferably the CPU starts the operational phase of first and/or second sub-unit when it has received predetermined safety signals from respectively the first and/or second sub-unit.

It is a further aim of the present disclosure to provide a computer program product comprising program code means stored on a computer readable medium for performing the method as described above when said program product is run on a computer.

DESCRIPTION OF THE DRAWINGS

The disclosed subject matter will be further elucidated by the following description and the appended figures.

DETAILED DESCRIPTION

Figure 1:
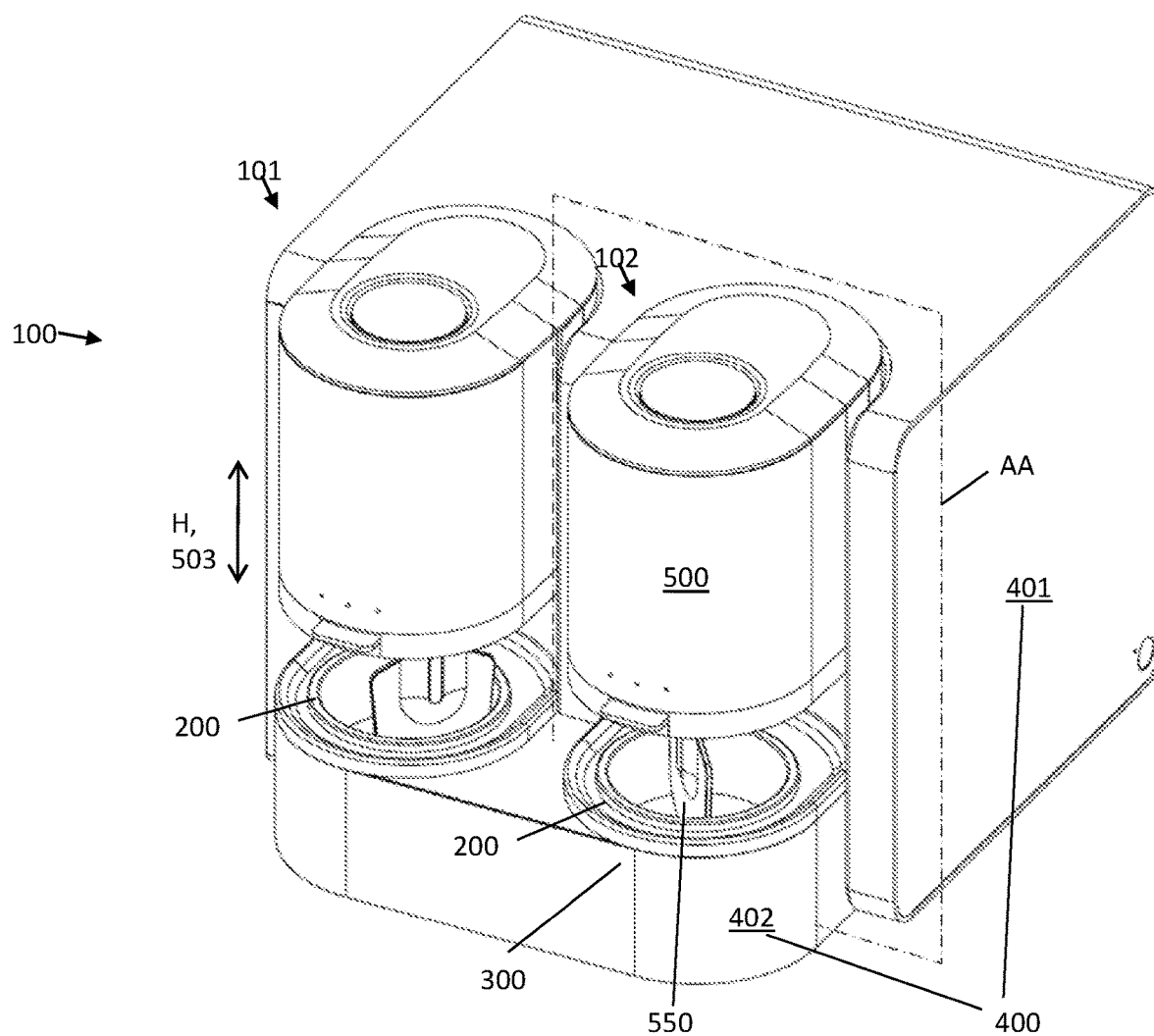
FIG. 1 shows a perspective overview of an embodiment of the device according to the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

FIG. 1 shows a device 100 according to an embodiment of the present disclosure for preparing a frozen food product, such as for example ice cream or sorbet, from a liquid mixture. The device 100 comprises a first sub-unit 101 which is arranged for preparing a frozen food product in a first cup 200, and a second sub-unit 102 which is arranged for preparing a frozen food product in a second cup 200, different from the first cup 200. The first sub-unit 101 and the second sub-unit 102 are arranged in a similar manner and operate independent from each other, such that two cups 200 of frozen food product can be prepared separate from each other. In alternative embodiments, the device 100 may more than two of the sub-units 101, 102. Since the first sub-unit 101 and the second sub-unit 102 are arranged in similar manner, the features of the device 100 will be discussed below only with respect to one of the sub-units 101, 102 where possible. The cup 200 comprises a cup wall which encloses a holding volume. The holding volume is arranged for holding the liquid mixture therein, and also for holding the frozen food product therein after the frozen food product has been prepared form the liquid mixture. At the top, the cup 200 comprises a top opening via which the holding volume can be accessed. The cup 200 may be pre-filled with the liquid mixture, whereby the top opening is sealed off by one or more sealing elements (not shown), such as a sealing membrane and a lid. The sealing elements can then be taken off the cup 200 before the cup 200 is to be used with the device 100. The cup 200 may also be a reusable cup 200, which is filled right with a liquid mixture from a package pre-filled with liquid mixture or with a self-made liquid mixture before the cup 200 is to be used with the device 100.

The device 100 comprises at its bottom a cup holder 300 which is arranged for holding the cup 200, preferably in a fixed position, while the frozen food product is being prepared in the cup 200. Therefore, the device 100 comprises a cavity in which the cup 200 can be received via an entrance opening. The entrance opening of the cavity is located in a first upper surface of the cup holder 300. A detailed description of cup holder and the cup, in particular of the corresponding shapes of the cavity of the cup holder and the cup, is given in the incorporated patent applications PCT/EP2020/070861 and PCT/EP2020/070860.

The device 100 also comprises a cooling unit 400. The cooling unit 400 is arranged for cooling the cavity of the cup holder 300, and more specifically for cooling a cup 200 received in the cavity. The cooling unit 400 should be arranged to provide sufficient cooling for freezing the liquid mixture contained in the cup 200 while preparing a frozen food product from the liquid mixture. The cooling unit 400 comprises a common part 401 i.e. parts that are mutualised between the different sub-units 101, 102, comprising one or more compressors, motors for driving the compressors, and condensers. The cooling unit 400 further comprises individual parts, i.e. individual for each sub-unit 101, 102, comprising cooling pipes, which are arranged around each cavity such as to form an evaporator 402, and through which a cooling fluid is transported for cooling the cavities. Details of the cooling unit are described below with respect to FIGS. 2-8.

The device 100 also comprises a stirring unit 500 which is arranged above the cup holder 300. The stirring unit 500 comprises a stirring element 550, and is configured for stirring the liquid mixture in the cup 200 by said stirring element 550 for preparing the frozen food product. The stirring element 550 is removably connectable to the stirring unit 500, such that the stirring element 550 can be taken out of the device 100 for cleaning. The stirring unit 500 comprises a moveable portion which is moveable along a height direction H, further also referred to as the second translation direction 503 between a first position and a second position as shown. In the first position, also referred to as the open position, the stirring element 550 is arranged outside of the cup 200, such that it is easily accessible for disconnecting it from the stirring unit 500 for cleaning and for connecting it to the stirring unit 500. In the second position, also referred to as the closed position, the stirring element 550 is arranged inside the cup 200 such that the stirring unit 500 can stir the liquid mixture in the cup 200 by the stirring element 550 for preparing the frozen food product. A detailed description of the stirring unit 500 is given in the incorporated patent application PCT/EP2020/070864 and PCT/EP2020/070863.

The stirring unit 500 is also provided with a protection screen (not shown). The protection screen 510 extends downwards from the stirring unit 500, and moves together with the stirring unit 500. When the stirring unit 500 is in the closed position, the protection screen is also in a closed position wherein it closes off an area located above the cup 200 and between the cup holder 300 and the stirring unit 500. This prevents access to the moving stirring element 550 when the frozen food product is being prepared, which is beneficial for safety. A further safety feature is that, in the closed position of the stirring unit 500, the bottom edge of the protection screen supports on the upper surface of the cup holder 300, such that it is difficult to get underneath the protection screen and lift it up to gain access to the closed off area. The protection screen is also beneficial for the cleanliness of the device 100, since it contains spilled liquid mixture or frozen food product in the closed off area, and prevents it from further spreading over the device 100. A contact sensor (not shown) is provided on the cup holder 300 at the position where the protection screen contacts the cup holder 300. The contact sensor detects that the protection screen is in the closed position.

Figure 2:
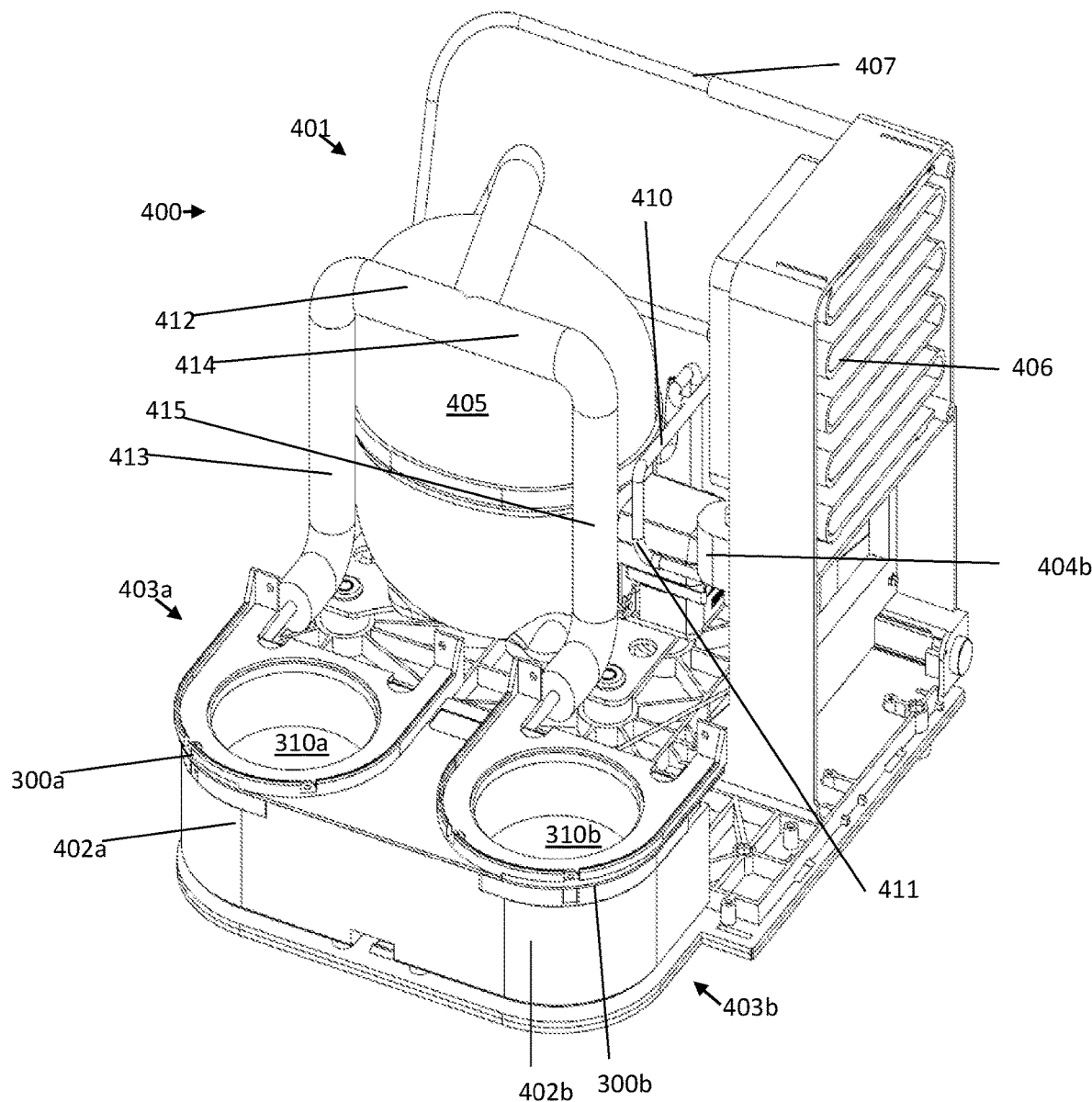
FIGS. 2 and 3 show a perspective view of the cooling unit of the device shown in FIG. 1.
Figure 3:
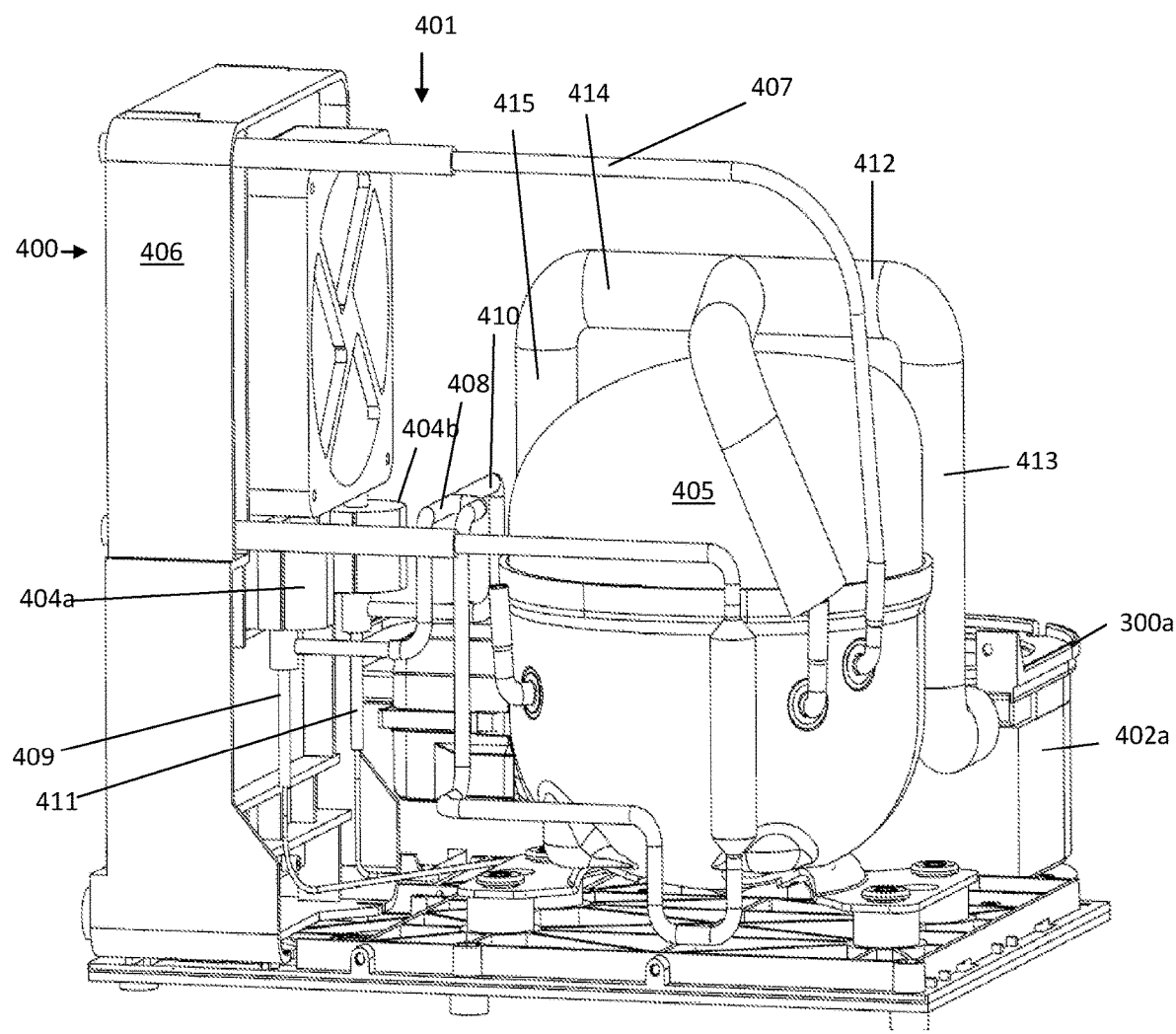
Figure 4:
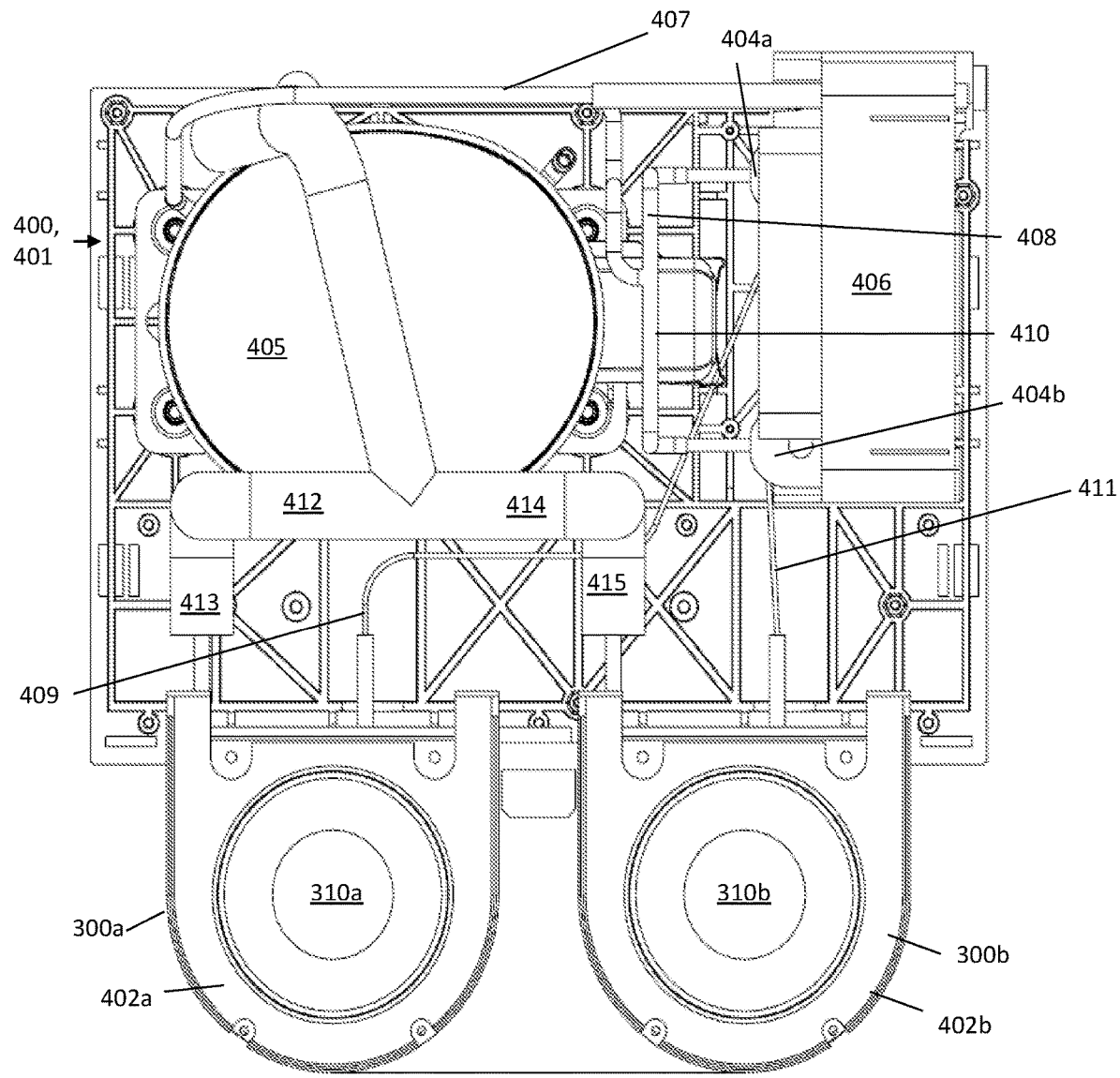
FIG. 4 is a top view of the cooling unit as shown in FIGS. 2 and 3.

FIGS. 2 and 3 shown a perspective view of the cooling unit 400 of the device 100 shown in FIG. 1. FIG. 4 shows the cooling unit of FIGS. 2 and 3 from above. As shown in FIGS. 2-4, the cooling unit 400 comprises a first individual part 403a comprising a first throttling element 404a and a first evaporator 402a, wherein the first evaporator 402a is positioned around the cavity 310a of the first cup holder 300a. The cooling unit 400 furthermore comprises a second individual part 403b comprising a second throttling element 404b and a second evaporator 402b, wherein the second evaporator 402b is positioned around the cavity 310b of the second cup holder 310b. The cooling unit 400 further comprises a common part 401 comprising a compressor 405 and a condenser 406. The common part 401 is the part of the cooling unit 400 that is mutualised by the different sub-units 101, 102, whilst the individual parts 403a, 403b are associated with an individual sub-unit 101, 102. The common part 401 is connected to the first and second individual parts 403a, b such as to deliver compressed liquid medium to the individual parts 403a, b and to receive decompressed gaseous medium from the individual parts 403a, b. The common part 401 and the individual parts 403a, b for example comprise tubing for carrying a heat medium such as R134, R12 or R22. The tubing 407 in the common part 401 interconnects the compressor 405 with the condenser 406. Beyond the condenser, the tubing 407 of the common part splits into a first branch 408 on which tubing 409 of the first individual part 403a connects and a second branch 410 on which the tubing 411 of the second individual branch 403b connects. Beyond the compressor 405, the tubing 407 of the common part 401 splits into a third branch 412 on which the tubing 413 of the first individual part 403a connects and a fourth branch 414 on which the tubing 415 of the second individual part 403b connects. The tubing of the first individual part 403a sequentially interconnects the first branch 408 of the common part 401, the first throttling element 404a, the first evaporator 402a and the third branch 412 of the common part 401. The tubing of the second individual part 403b sequentially interconnects the second branch 410 of the common part 401, the second throttling element 404b, the second evaporator 402b and the fourth branch 414 of the common part 401. The present embodiment has the advantage that each individual part 403a, b can be separately activated during the operational phase of its corresponding sub-unit 101, 102. Each individual part 403a, 403b comprises an on/off-switch (not shown) that is opened when the sub-unit 101, 102 of the individual part 403a, b is in the operational phase. The cooling unit 400 is a vapor compression refrigeration system.

Figure 5:
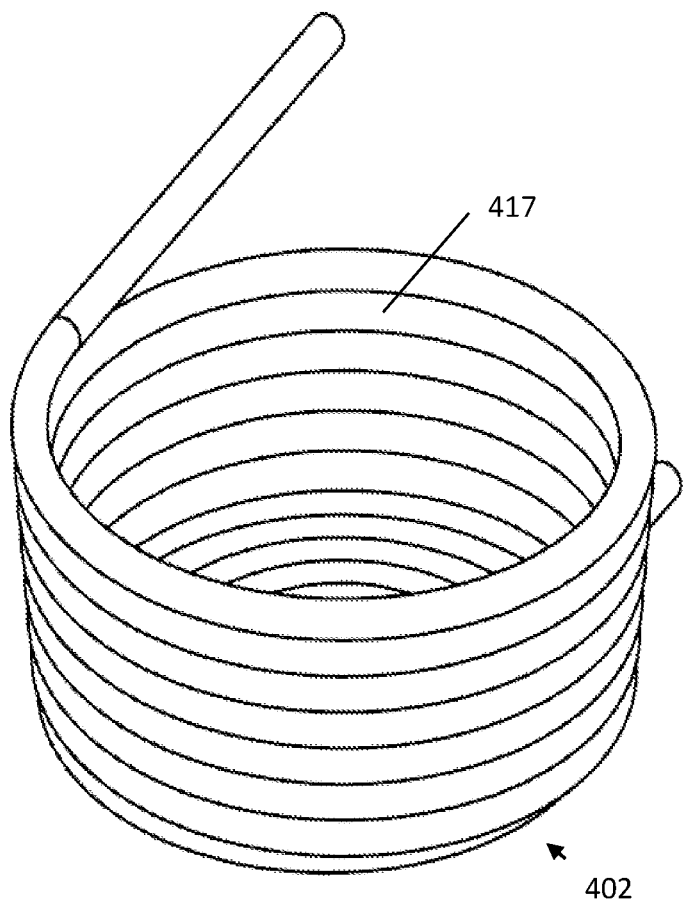
FIG. 5 is a perspective view of the helical winding of the evaporator of the cooling unit shown in FIGS. 2-3.
Figure 6:
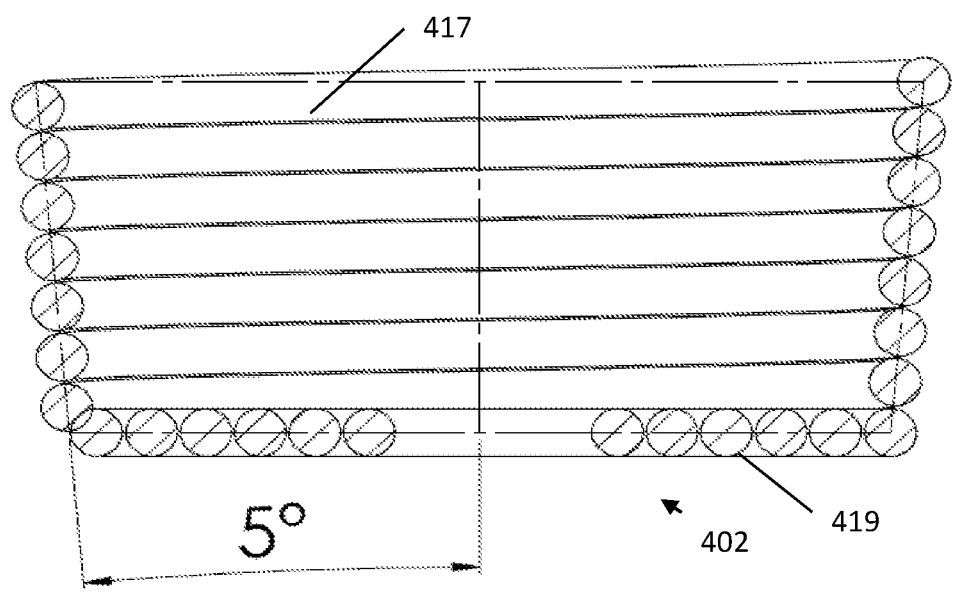
FIG. 6 is a cross-section view of the helical winding shown in FIG. 4 along the section AA shown in FIG. 1.
Figure 7:
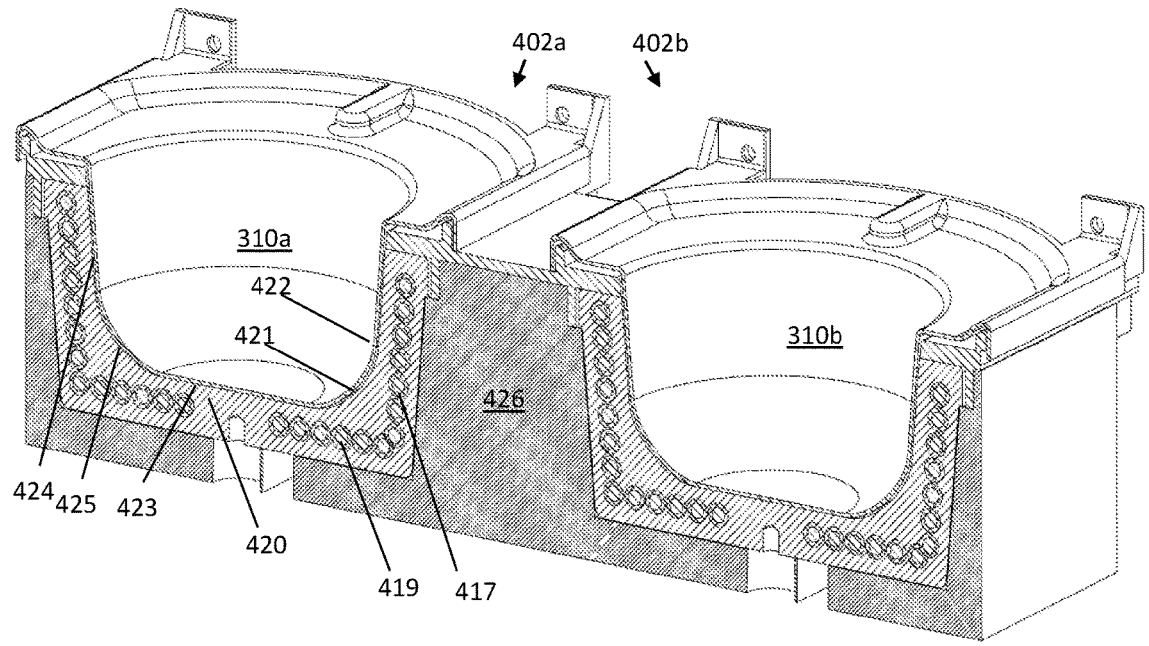
FIG. 7 is a perspective cross-sectional view of the evaporator shown in FIGS. 2 and 3 along the section AA in FIG. 1.
Figure 8:
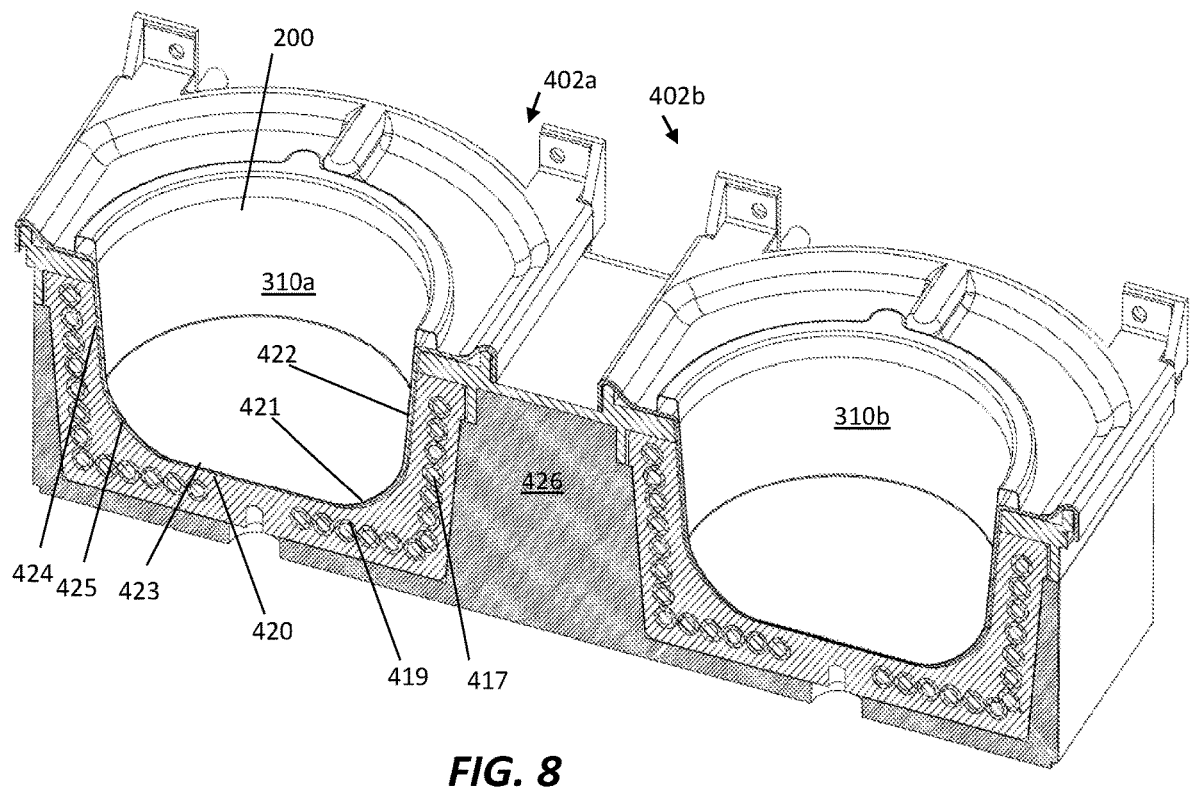
FIG. 8 is a perspective cross-sectional view of the evaporator shown in FIGS. 2 and 3 along the section AA in FIG. 1, wherein a cup is placed in the cavity of the cup holder surrounded by the evaporator.

FIGS. 5-8 show in detail the construction of (parts of) the evaporator 402a, b. FIG. 5 is a perspective view of the helical winding of the evaporator of the cooling unit shown in FIGS. 2-3. FIG. 6 is a cross-section view of the helical winding shown in FIG. 4 along the section AA shown in FIG. 1. FIG. 7 is a perspective cross-sectional view of the evaporator shown in FIGS. 2 and 3 along the section AA in FIG. 1. FIG. 8 is a perspective cross-sectional view of the evaporator shown in FIGS. 2 and 3 along the section AA in FIG. 1, wherein a cup is placed in the cavity of the cup holder surrounded by the evaporator. The evaporator 402a, b i.e. as well the first evaporator 402a as the second evaporator 402b, comprises a fluid channel coiled around the sidewalls of the cavity 310 of the cup holder in a helical winding 417. The helical winding 417 of the fluid channel forms a frustrated right cone i.e. the helical windings 417 form a right cone, whose top is cut off. The slope of the cone follows the slope of the sidewalls of the cavity 310 of the cup holder 300. The slope of the cone is defined by the inclination angle ($\alpha$) of the cone sidewalls with respect to the centre axis of the cone. The inclination angle ($\alpha$) is 5°. The evaporator 402a, b further comprises a fluid channel, in particular as a continuation of the helically wrapped fluid channel 417, coiled underneath the bottom wall of the cavity 310 of the cup holder, in particular in a spiral winding 419. The fluid channel of the evaporator 402a, b is enrobed by a thermally conductive material 420 such as to increase the area of contact between the fluid channel and the cavity 310. The enrobing of the fluid channel with the thermally conductive material 420 is obtained by pouring liquid thermally conductive material over the fluid channel. The thermally conductive material 420 is a thermally conductive metal. The thermally conductive material 420 is delimited by a cooling surface 421 i.e. the surface adjacent to the cup 200 when in use. The cooling surface 421 forms a continuous surface, i.e. as opposed to the discontinuous surface formed by the adjacently positioned fluid channel windings 417, 419, thereby increasing the contact area between the evaporator 402a, b and the cavity 310. The cooling surface 421 is covered by an intermediate plate 422 forming the cavity walls with which the cup 200 comes in direct contact. The cooling surface 421 of the thermally conductive material 420 of the evaporator 402a, b is cup-shaped. In particular, the cooling surface 421 of the thermally conductive material 420 comprises a flat bottom portion 423, a circumferential upright portion 424, and a circumferential transition portion 425 extending from the bottom portion 423 to the upright portion 424. The bottom portion 423, the upright portion 424 and the transition portion 425 are cylindrically symmetric around a first axis centrally through the bottom portion 423 and extending along a height direction. The upright portion 424 has with respect to the height direction a predetermined inclination angle of 5°. Thermal insulation 426 having a thermal conductivity lower than air, is provided between the first evaporator 402a and the second evaporator 402b such as to limit the influence of the operational phase of the first sub-unit on the operational phase of the second sub-unit.

The invention claimed is:

1. A device for preparing a frozen food product from a liquid mixture, the device comprising:
   a first sub-unit comprising a first cup holder comprising a cavity configured for releasably receiving a cup in which the frozen food product is to be prepared from the liquid mixture, and a first stirring unit associated with the first cup holder,
   a second sub-unit comprising a second cup holder comprising a cavity configured for releasably receiving a cup in which the frozen food product is to be prepared from the liquid mixture, and a second stirring unit associated with the second cup holder, and
   a cooling unit configured for cooling the cavity of at least one of the first and second cup holder during an operational phase of respectively the first and second sub-unit, wherein the cooling unit comprises:
      a first individual part comprising a first throttling element and a first evaporator positioned around the cavity of the first cup holder,
      a second individual part comprising a second throttling element and a second evaporator positioned around the cavity of the second cup holder, and
      a common part comprising a compressor and a condenser, wherein the common part is connected to the first and second individual parts such as to deliver compressed liquid medium to the individual parts and to receive decompressed gaseous medium from the individual parts,
   wherein during the operational phase of at least one of the first or second sub-unit, respectively the first or second stirring unit is active, and the cooling unit is active, so as to transform liquid mixture into the frozen food product,
   wherein the common part of the cooling unit is active if any one of the first or second sub-unit is in the operational phase, and wherein during the operational phase of at least one of the first or second sub-unit, respectively the first or second individual part of the cooling unit is active, and
   wherein each of the first individual part and the second individual part of the cooling unit is provided with an opening/closing-valve between the common part of the cooling unit and respectively the first throttling element and the second throttling element, and wherein an activation of at least one of the first or second individual part of the cooling unit comprises opening the respective opening/closing-valve.

2. The device according to claim 1, wherein the cooling unit is a vapor compression refrigeration system.

3. The device according to claim 1, wherein at least one of the first throttling element or the second throttling element is an expansion valve.

4. The device according to claim 1, wherein thermal insulation is provided between the first evaporator and the second evaporator.

5. The device according to claim 1, wherein at least one of the first evaporator or the second evaporator comprises a fluid channel coiled around sidewalls of the cavity of the cup holder in a helical winding, wherein the helical winding of the fluid channel forms a frustrated cone, and wherein at least one of the first evaporator or the second evaporator further comprises a fluid channel coiled underneath a bottom wall of the cavity of the cup holder in a spiral winding.

6. The device according to claim 5, wherein the fluid channel of at least one of the first evaporator or the second evaporator is enrobed by a thermally conductive material such as to increase an area of contact between the fluid channel and the cavity.

7. The device according to claim 1, wherein the device comprises a central processing unit (CPU) and wherein at least one of the first and second sub-unit enters the operational phase when the CPU has received predetermined safety signals.

8. The device according to claim 7, wherein one of the predetermined safety signals is a start/stop signal generated by pressing a start/stop button provided on each sub-unit of the device.

9. The device according to claim 7, wherein each sub-unit comprises a protective screen attached to the stirring unit in such a manner that the protective screen can be moved from an open position wherein the cavity of the cup holder is accessible to a user, to a closed position wherein the protective screen touches the cup holder such that the cavity of the cup holder is not accessible to the user, and wherein a closed-screen signal is generated when the protective screen is in the closed position, and wherein one of the predetermined safety signals is the closed screen signal.

10. The device according to claim 7, wherein the cup holder comprises a detection means for detecting the presence of a cup in the cavity of the cup holder and for emitting a presence signal upon detecting the presence of the cup in the cavity of the cup holder, and wherein one of the predetermined safety signals is the presence signal.

11. The device according to claim 7, wherein each stirring unit comprises:
   a stirring element configured for, during the operational phase, stirring with a stirring motion the liquid mixture in the cup for preparing the frozen food product, and
   a drive system configured for, during the operational phase, driving the stirring motion of the stirring element in the cup, wherein the drive system comprises a motor and a coupling element configured for releasably coupling the stirring element to the motor, and configured for transforming rotation of the motor into the stirring motion of the stirring element, wherein the coupling element comprises a fixed part, and a moveable part moveably arranged relative to the fixed part, wherein the moveable part comprises a rotor part arranged during the operational phase to rotate with respect to the fixed part, and a translating part attached to the rotor part by a spring member such as to enable during an initialization phase the translation of the translating part with respect to the rotor part along a first translational axis and so as to follow during the operational phase rotation of the rotor part, and wherein the translating part comprises coupling means to releasably couple with the stirring element, wherein the fixed part comprises a proximity sensor arranged to detect a distance of the translating part relative to the fixed part along the first translational axis and to generate an activation signal when the distance is below a predetermined proximity threshold, wherein one of the predetermined safety signals is the activation signal.

12. A method for preparing a frozen food product from a liquid mixture, comprising:
providing the device according to claim 1;
placing a first cup with the liquid mixture into the cavity of the cup holder of the first sub-unit;
placing a second cup with the liquid mixture into the cavity of the cup holder of the second sub-unit; and
preparing the frozen food product from the liquid mixture in at least one of the first and second sub-unit during the operational phase of respectively the first and second sub-unit.

13. Method according to claim 12, wherein during the operational phase of at least one of the first and second sub-unit, respectively the first and second stirring unit are kept active, and the cooling unit is kept active, such as to transform liquid mixture into the frozen food product.

14. Method according to claim 13, wherein during the operational phase of at least one of the first and second sub-unit, respectively the first and second stirring unit are kept active, the common part of the cooling unit is kept active, and respectively the first and second individual part of the cooling unit is kept active, such as to transform liquid mixture into the frozen food product.

15. Method according to claim 12, wherein the device comprises a central processing unit, CPU, and wherein at least one of the first and second sub-unit enters the operational phase when the CPU has received predetermined safety signals, wherein the CPU starts the operational phase of at least one of the first and second sub-unit by activating the cooling unit and by activating respectively the first and second stirring unit.

16. Method according to claim 15, wherein the CPU starts the operational phase of at least one of the first and second sub-unit by activating the common part of the cooling unit, respectively the first and second individual part of the cooling unit, and respectively the first and second stirring unit.

17. Method according to claim 15, wherein the CPU starts the operational phase of at least one of the first and second sub-unit when it has received predetermined safety signals from respectively the first and second sub-unit.

18. A device for preparing a frozen food product from a liquid mixture, the device comprising:
a first sub-unit comprising a first cup holder comprising a cavity configured for releasably receiving a cup in which the frozen food product is to be prepared from the liquid mixture, and a first stirring unit associated with the first cup holder,
a second sub-unit comprising a second cup holder comprising a cavity configured for releasably receiving a cup in which the frozen food product is to be prepared from the liquid mixture, and a second stirring unit associated with the second cup holder, and
a cooling unit configured for cooling the cavity of at least one of the first and second cup holder during an operational phase of respectively the first and second sub-unit, wherein the cooling unit comprises:
a first individual part comprising a first throttling element and a first evaporator positioned around the cavity of the first cup holder,
a second individual part comprising a second throttling element and a second evaporator positioned around the cavity of the second cup holder, and
a common part comprising a compressor and a condenser, wherein the common part is connected to the first and second individual parts such as to deliver compressed liquid medium to the individual parts and to receive decompressed gaseous medium from the individual parts,
wherein the device comprises a central processing unit (CPU) and wherein at least one of the first and second sub-unit enters the operational phase when the CPU has received predetermined safety signals, wherein one of the predetermined safety signals is a start/stop signal generated by pressing a start/stop button provided on each sub-unit of the device.

19. A device for preparing a frozen food product from a liquid mixture, the device comprising:
a first sub-unit comprising a first cup holder comprising a cavity configured for releasably receiving a cup in which the frozen food product is to be prepared from the liquid mixture, and a first stirring unit associated with the first cup holder,
a second sub-unit comprising a second cup holder comprising a cavity configured for releasably receiving a cup in which the frozen food product is to be prepared from the liquid mixture, and a second stirring unit associated with the second cup holder, and
a cooling unit configured for cooling the cavity of at least one of the first and second cup holder during an operational phase of respectively the first and second sub-unit, wherein the cooling unit comprises:
a first individual part comprising a first throttling element and a first evaporator positioned around the cavity of the first cup holder,
a second individual part comprising a second throttling element and a second evaporator positioned around the cavity of the second cup holder, and
a common part comprising a compressor and a condenser, wherein the common part is connected to the first and second individual parts such as to deliver compressed liquid medium to the individual parts and to receive decompressed gaseous medium from the individual parts,
wherein the device comprises a central processing unit (CPU) and wherein at least one of the first and second sub-unit enters the operational phase when the CPU has received predetermined safety signals,
wherein each sub-unit comprises a protective screen attached to the stirring unit in such a manner that the protective screen can be moved from an open position wherein the cavity of the cup holder is accessible to a user, to a closed position wherein the protective screen touches the cup holder such that the cavity of the cup holder is not accessible to the user, and wherein a closed-screen signal is generated when the protective screen is in the closed position, and wherein one of the predetermined safety signals is the closed screen signal.

* * * * *